United States Patent [19]
Alexandres

[11] Patent Number: 5,298,712
[45] Date of Patent: Mar. 29, 1994

[54] WELDING SYSTEM FOR A BATTERY PACK

[75] Inventor: Richard B. Alexandres, Clear Lake, Iowa

[73] Assignee: Alexander Manufacturing Company, Mason City, Iowa

[21] Appl. No.: 925,174

[22] Filed: Aug. 6, 1992

[51] Int. Cl.⁵ .............................................. B23K 11/11
[52] U.S. Cl. .............................. 219/117.1; 219/56.1; 219/56.22; 219/86.9; 219/87; 219/108
[58] Field of Search ............... 219/56.1, 56.21, 56.22, 219/86.9, 87, 106, 114, 108, 117.1

[56] References Cited
U.S. PATENT DOCUMENTS

| | | | |
|---|---|---|---|
| 1,189,584 | 7/1916 | Kicklighter | 219/87 |
| 2,243,832 | 6/1941 | Bohn | 219/114 |
| 3,810,790 | 5/1974 | Denis | 219/56.22 |
| 4,322,597 | 3/1982 | Hooke | 219/106 |

FOREIGN PATENT DOCUMENTS 0029925  6/1981  European Pat. Off. .............. 219/87

Primary Examiner—Clifford C. Shaw
Attorney, Agent, or Firm—Hugh D. Jaeger

[57] ABSTRACT

A welding system for a battery pack utilizing three-phase 400 Hz power at low voltage over a short time period. In utilizing these parameters, there is minimal or no migration of materials between a welding area, welding electrodes, a metal member and a battery cell.

13 Claims, 4 Drawing Sheets

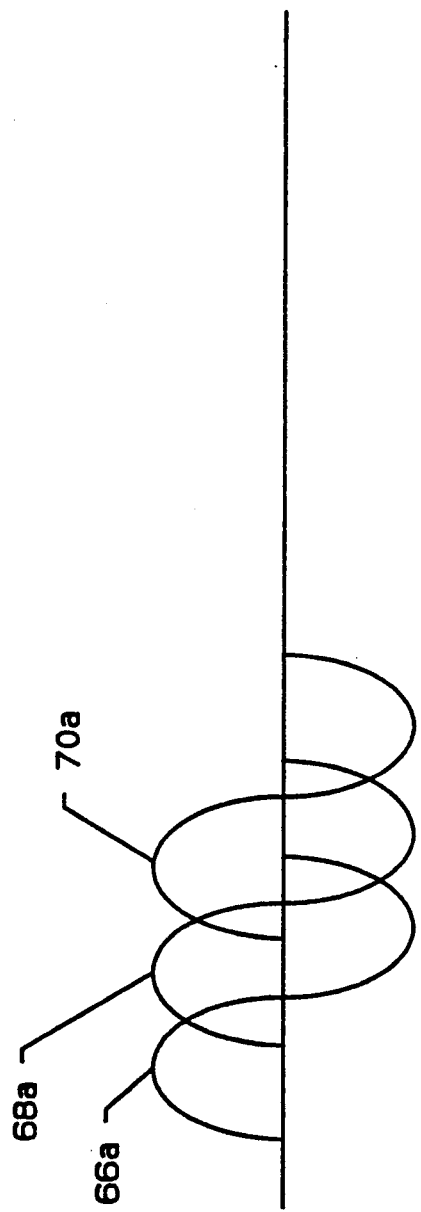

WELDING SYSTEM FOR A BATTERY PACK

BACKGROUND OF THE INVENTION

1. Field of the Invention

The present invention pertains to a welding system for a battery pack, and more particularly, pertains to a welding system for a battery pack by utilizing three-phase power to weld in a geometrical configuration about a plurality of electrodes.

2. Description of the Prior Art

Prior art welding of battery packs presents special problems. The work pieces are dissimilar materials which are always difficult to weld. In addition, the work pieces are of different thickness. The battery cap is relatively massive when compared to the thin interconnecting battery straps. The weld nugget formed during welding, while bridging the interface between the battery cap and connector straps, tends to form on the surface of the battery strap due to its thinness. As a result, weld metal can adhere to the welding electrodes and the weld will tear loose on withdrawal of the electrodes. The prior art welds are usually made using DC or capacitor discharge power sources. The production of consistently good welds with these power sources is a problem in the prior art.

The present invention overcomes the disadvantages of the prior art by providing a welding system for a battery pack.

SUMMARY OF THE INVENTION

The general purpose of the present invention is three-phase AC welding by a welding system for a battery pack, and more preferably for NiCad battery packs.

According to one embodiment of the present invention, there is provided a welding system for welding a battery pack, including an AC power source, a motor generator to convert the AC power source from 60 cycle into 400 cycle three-phase power, electronic timers connected into the individual phases of the 400 Hz power supply, transformers connected between a plurality of welding electrodes and the electronic timer, whereby the electronic timer controls power distribution from the three-phase 400 Hz power supply to the welding electrodes, thereby causing the electrodes to weld a member, such as a metal material, to battery caps of a plurality of batteries for forming a battery pack.

One significant aspect and feature of the present invention is a welding system which utilizes three-phase power to minimize power consumption in welding a battery pack, as well as expediting the process of welding of a battery pack.

Another significant aspect and feature of the present invention is a welding system utilizing timer controlled three-phase power to enhance welding between a battery cap and a metal member at a plurality of distinct points, such as three distinct points with no or least migration between the metal and the welding electrodes.

A further significant aspect and feature of the present invention is a welding system for a battery pack which provides for welding of the battery pack in reduced time compared to the prior art welding processes for a battery pack.

Still another significant aspect and feature of the present invention is a welding system where welds sequentially receive peak current with 120° electrical phase differential intervals.

Having thus described the embodiments of the present invention, it is a principal object hereof to provide a welding system for welding a battery pack utilizing three-phase power connected to a plurality of electrodes.

One object of the present invention is to utilize three-phase power which provides for welding of a metal to a battery cap of a battery to form a battery pack. The welding process, negates or minimizes any migration of materials between the welding electrodes and the metals being welded.

Another object of the present invention is a welding system for a battery pack for welding NiCad batteries to a flexible board with a polymer substrate to form a battery pack.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 4 illustrates the cycles of the power during the welding operation.

DETAILED DESCRIPTION OF THE PREFERRED EMBODIMENTS

Figure 1:
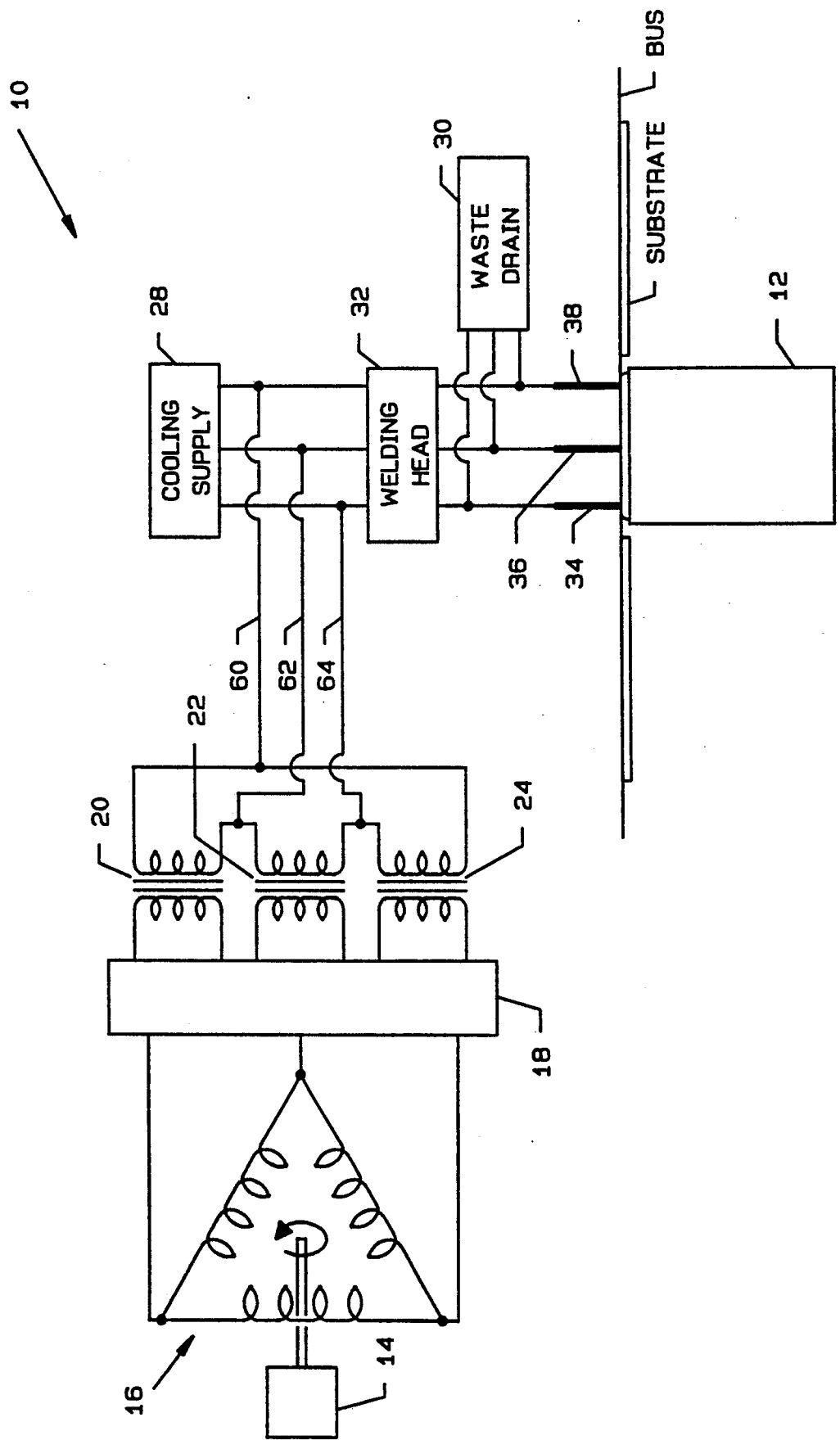
FIG. 1 illustrates an electrical circuit schematic diagram of a welding system for a battery pack, the present invention.

FIG. 1 illustrates an electrical circuit schematic diagram of a welding system 10, the present invention, for a battery cell pack 12, including a three-phase AC power source comprised of a motor 14 and generator 16, a firing board 18, transformers 20, 22 and 24, and a welder assembly 26, as now described in detail. The three-phase AC power source is preferably in a frequency range of about 400 cycles, and can be generated by a suitable motor 14 and generator 16, as are customarily available. In this instance, the motor 14 is connected to the generator is 16, where the motor 14 is connected to three-phase 60 cycle power and the generator generates three-phase 400 Hz power at 220 volts. An electronic timer 18, having a timing board, connects to and switches power from the generator 16 individually to three transformers 20, 22, and 24, which reduce the 220 volt source to appropriately 3 volts. The welder 26 includes a cooling supply 28, a waste drain 30, a welding head 32, three welding electrodes 34, 36 and 38 extending from the welding head 32, which connect to each of the three transformers 20, 22 and 24 and which are arranged in a triangular configuration so that welding occurs in a triangular or other predetermined geometrical pattern. The electrodes can be water cooled if necessary. Because of the alternating current welding and phase lead or lag, peak power is sequentially and adequately delivered to the three electrodes. As a result, there is negligible or no migration of weld metal to the welding electrodes, thereby preventing or minimizing sticking between the weld and electrodes and resulting tracing of the weld upon electrode withdrawal.

Figure 2:
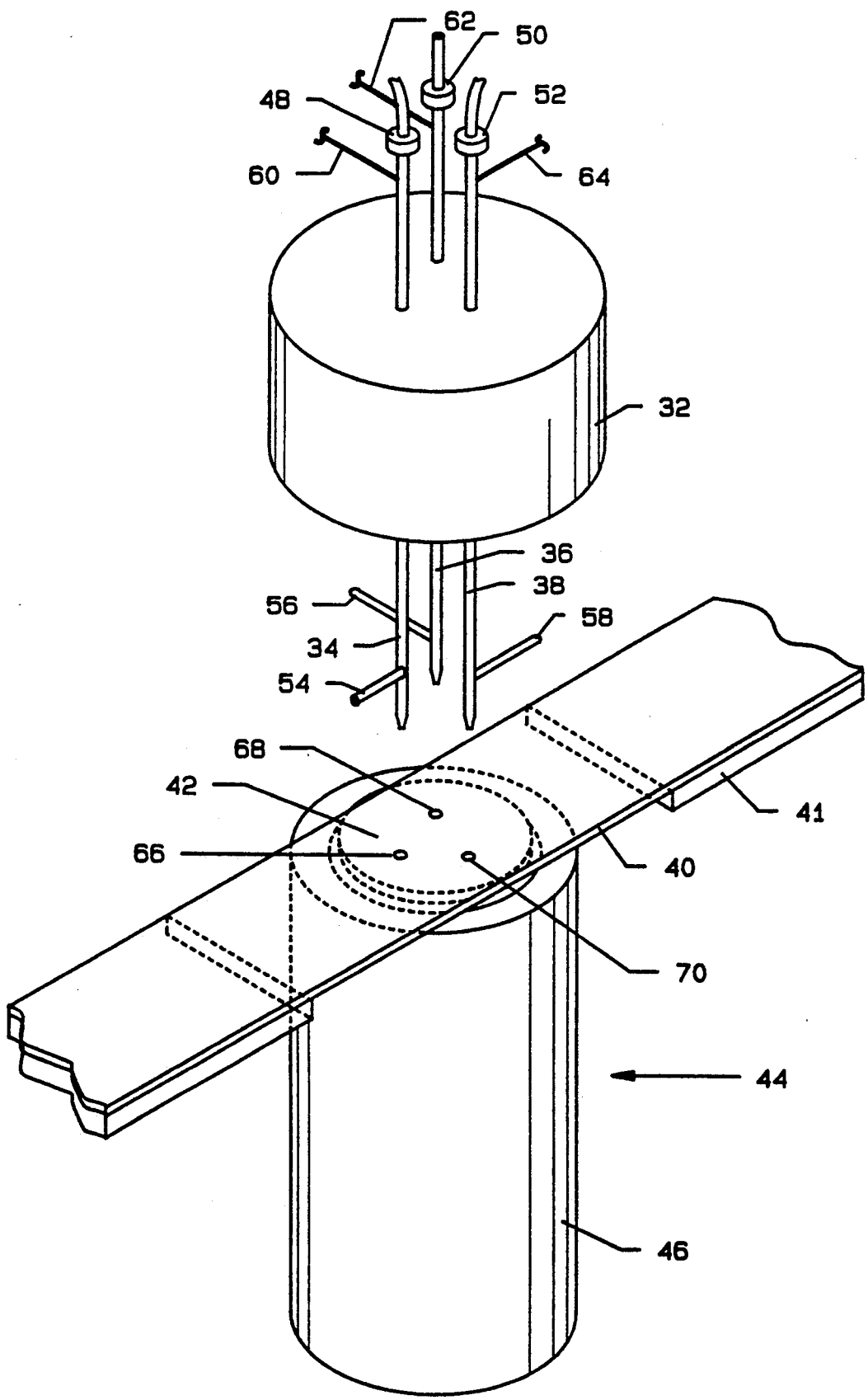
FIG. 2 illustrates a perspective view of welding electrodes in alignment with a connector strip and a battery cap.

FIG. 2 illustrates a perspective view of the electrodes 34-38 in alignment with a metal battery pack connector strip 40 on a polymer substrate 41 and a battery cap 42 of a battery 44 having a case 46 where all numerals correspond to those elements previously described. The welding electrodes are hollow to accommodate coolant flow throughout. Coolant from the cooling supply 28 of FIG. 1 is delivered to the upper ends of the electrodes 34-38 and secured 48, 50 and 52 and exits the lower electrode region by means of tabs 54, 56 and 58 extending from the lower electrode region. Wires 60, 62 and 64 connect the electrodes 34, 36, and 38 to the transformers 20, 22 and 24. Welds 66, 68 and 70 are sequentially formed to electrically bond the connector strip 40 the battery cap 42.

MODE OF OPERATION

Figure 3:
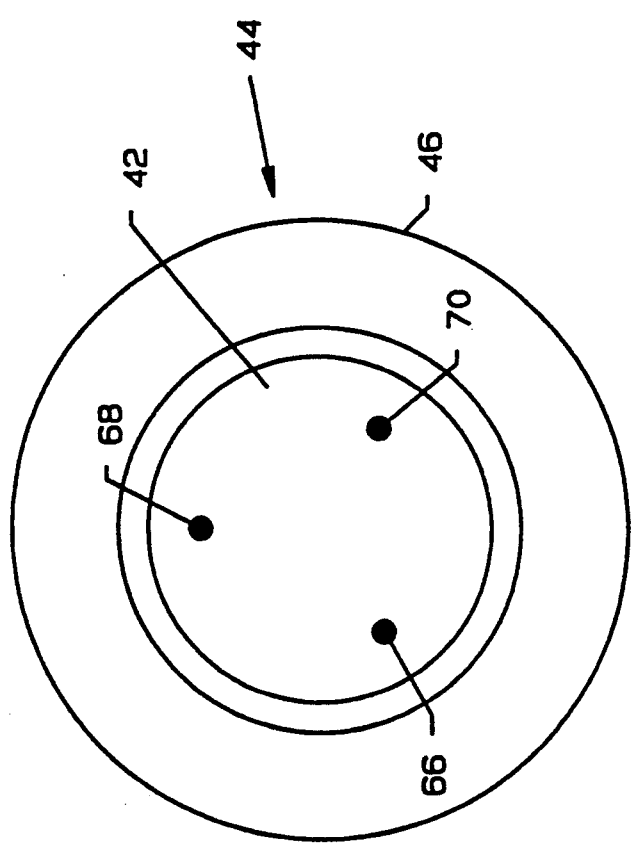
FIG. 3 illustrates a view of the current flow about the electrodes.

FIG. 3 illustrates a plan view of the welds 66-70 about the battery cap 42 where the welds are sequentially applied as 120° phasing differential. One weldment area, such as weld 66, is the subject of a peak current node while the other welds 68 and 70 are lagging weld 66 with respect to the peak current. As the current phases are shifted, weld 68 is the subject of a peak current node while the other weldment areas 66 and 70 lag with respect to peak current. The current phase shift then makes the weld 70 the subject of a peak current node while the other two lag. This process is repeated until the desired weldment is achieved.

FIG. 4 illustrates the cycles of the power during the welding operation. FIG. 4 is indicative of one multiple waveform of a complete weld cycle for the three welds 66, 68 and 70. Current peak 66a corresponds to weld 66, 68a corresponds to weld 68, and 70a corresponds to weld 70.

Various modifications can be made to the present invention without departing from the apparent scope hereof.

I claim:

1. A process for welding a flat metal strip to a battery terminal, said flat metal strip having a thickness substantially less than that of the battery terminal, comprising the steps of:
   a. providing a three-phase power source;
   b. providing three resistance welding electrodes;
   c. connecting each phase of said three-phase power source to a different pair of said three resistance welding electrodes, thereby forming three distant resistance welding electrode pairs;
   d. engaging the flat metal strip and the battery terminal;
   e. engaging the three resistance welding electrodes with the flat metal strip; and,
   f. sequentially applying said three-phase power to the resistance welding electrode pairs.

2. The process of claim 1 wherein said sequential application of power is time controlled.

3. The process of claim 1 wherein said sequential application of power is phase controlled.

4. The process of claim 1 wherein said sequential application of power is peak power.

5. The process of claim 1 wherein said three-phase source is approximately 400 Hz.

6. The process of claim 1 further including the step of reducing said three-phase power from 220 volts to 3 volts at said resistance welding electrodes.

7. The process of claim 1 wherein said three phase power is 400 Hz and 3 volts at said resistance welding electrodes.

8. A welding system for a battery pack consisting of:
   a. a three-phase power source including three transformers having primaries and secondaries;
   b. power control means connected to said transformers;
   c. three resistance welding electrodes;
   d. means connecting each of said secondaries to a different pair of said three resistance welding electrodes to form distinct electrode pairs; and,
   e. means adapted to bring said resistance welding electrodes into engagement with a workpiece.

9. The system of claim 8 wherein said control means includes means in each phase of said three phase power.

10. The system of claim 9 wherein said control means sequentially applies said three-phase power to said electrode pairs.

11. The system of claim 10 wherein said control means controls the time of power application to each pair of said electrode pairs.

12. The system of claim 11 wherein said control means controls the time of application of peak power to said different pairs of said resistance welding electrodes.

13. The system of claim 11 wherein said three-phase power is 3 volts and 400 Hz at said electrode pairs.

* * * * *